(No Model.)
L. E. WHITON.
LATHE CHUCK.
No. 369,758. Patented Sept. 13, 1887.
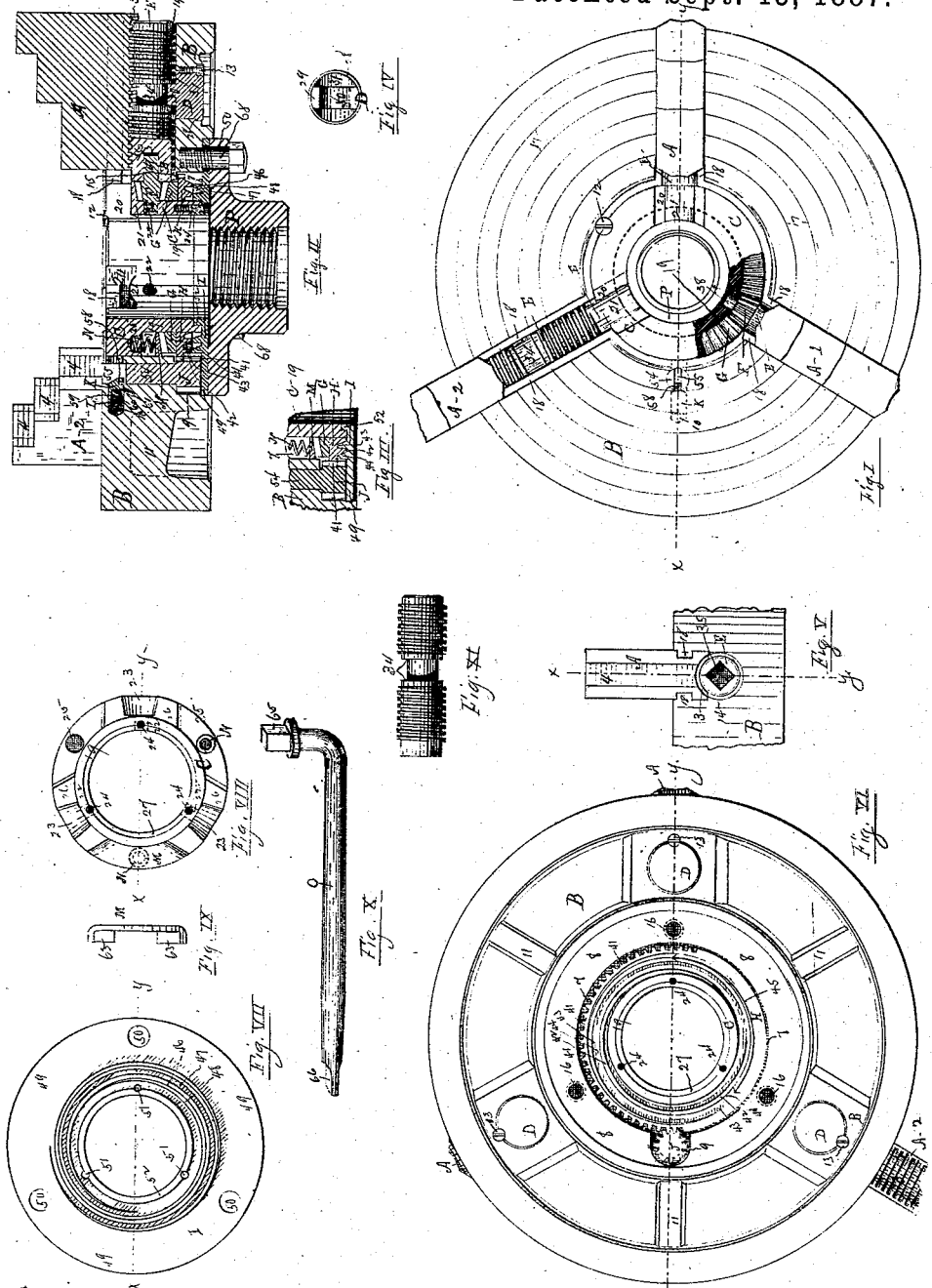

United States Patent Office.

LUCIUS E. WHITON, OF WEST STAFFORD, CONNECTICUT, ASSIGNOR TO THE D. E. WHITON MACHINE COMPANY, OF SAME PLACE.

LATHE-CHUCK.

SPECIFICATION forming part of Letters Patent No. 369,758, dated September 13, 1887.

Application filed May 22, 1885. Serial No. 166,334. (No model.)

*To all whom it may concern:*

Be it known that I, LUCIUS E. WHITON, of West Stafford, in the county of Tolland and State of Connecticut, have invented new and useful Improvements in Lathe-Chucks, of which the following is a full specification.

My invention relates to that class of chucks in which the jaws are moved by separate screws, which may be revolved independently or together at will.

The objects of my invention are, first, to provide a means of securing the actuating-screws which shall allow the jaws greater traverse than heretofore; second, (a) to provide cam-rings of improved form for raising the rack into engagement with the several pinions, (b) to provide convenient means for operating one of these cam-rings and locking it in position, (c) to provide an inexpensive arrangement of springs to force the rack out of engagement with the pinions when the cam-rings permit it, and (d) to provide certain improvements in the details of construction whereby the cost of manufacture may be lessened; third, to arrange the various parts so that the jaws may be easily reversed; fourth, to so inclose the working parts as to exclude all turnings, dirt, or other matter which would interfere with the operation of the chuck. I attain these objects by the mechanism and arrangement of parts illustrated in the accompanying drawings and hereinafter described.

In the drawings, Figure I is a face view of a lathe-chuck so made as to embody my improvements, and in which a portion of the center-case is broken away to show one of the beveled pinions with which each screw is provided and a part of the circular rack which may connect the several screws. Fig. II is a longitudinal section of the chuck and chuck-plate on line *x y* of the plan, showing the connecting-rack in gear with the pinions, in which position the jaws will move simultaneously. Fig. III is a section of a portion of the chuck on line *x y*, showing the rack out of gear with the pinions, in which position the jaws may be moved independently. Fig. IV is a view of the inner face of the piece which receives the reaction of the screw when the jaw is operated. Fig. V is an elevation of a portion of the chuck, showing the outer end of one jaw and screw and the square recess in the end of the screw which receives the key. Fig. VI is a view of the back of the chuck as it appears with the chuck-plate and fixed cam-ring removed. This view shows the revolving cam-ring with its spiral groove and segment of gear-teeth and the pinion by means of which the cam-ring is revolved. Fig. VII is a view of the inner surface of the fixed cam-ring, showing its spiral groove. Fig. VIII is a view of the inner face of the central shell of the chuck, with the revolving cam-ring, the circular rack, two of the shoe-segments, and one of the springs removed. Fig. IX is an elevation of one of the shoe-segments. Fig. X is a view in perspective of the key. Fig. XI is a view of the screw.

The several parts of the chuck are designated throughout by letters and the characteristics of each part by numbers.

Referring to the drawings, B is the main frame of the chuck. In its face a suitable number of radial guiding-slots are made, each of which is provided with retaining-ribs 18. Into each of these guiding-slots jaws A are fitted in the usual manner. The bottom of each jaw is hollowed out and screw-threaded, as shown at 3, so as to engage properly with its actuating-screw. In the bottom of the radial slot a cylindrical recess, 14, Figs. II and V, is made, the axis of which is parallel with the center line of the slot and lies in the vertical plane passing through said center line, but is lower than the plane of the bottom of the slot. This recess 14 is made of suitable diameter to receive the screw E, which is made larger than in previous practice. The screw E being inserted in this recess, its screw-thread will become engaged with that of the jaw A, provided the recess be of proper depth. The sides of this recess will prevent the screw from falling out in any but a radial direction, no matter what the position of the chuck, even though the jaw be removed.

To secure the greatest possible traverse of the jaw A, it is necessary that the screw-thread should extend as nearly as possible to each end of the screw E, and all endwise motion of the screw must be prevented. To accomplish these results the center of the screw E, where the thread can best be spared, is turned down for a short distance, forming shoulders 34, through which the reaction may be received. To receive this reaction thrust-pins or bearings D, having their inner faces made of such shape as to fit accurately the recess 34, are inserted through holes made in the back of the frame B. Referring to any one of these pieces D, Fig. IV, the hole in frame B, into which it is to be firmly driven, is so made that its axis will be at right angles with that of the screw E, and will also lie wholly in the vertical plane passing through the center of the guiding-slot and the axis of the screw. The piece D is provided with a shoulder, 28. When firmly driven in against this shoulder, the projection 29 will fill the lower half of the recess 34; also, the surfaces 30 and 34 will be just in contact, and the surface 31 will form a continuation of the surface of the cylindrical recess 14. In this position the projection 29 will prevent all endwise motion of the screw E. The thrust-pins D are held in place by screws 13, tapped into the joint, as shown. A square hole, 35, adapted to receive the squared end 65 of the key O, is made in the outer end of the screw E. This hole permits the screw to be operated without necessitating any projecting end likely to catch the operator's clothing, and does not shorten the screw-thread. By these arrangements I secure much greater radial traverse than has heretofore been known in chucks of this class, thus increasing their capacity, as shown at $A^2$, Fig. I.

The inner end of each of the screws E is provided with a beveled pinion, F, one end of which is turned down to form a journal, 38. The outer end, 39, of this pinion is made square or of other prismatic form, and is firmly fixed by shrinkage or otherwise in a similarly-shaped recess, 36, of the screw E, so that both must invariably turn together. These pinions project into the central recess, 7, of the frame B. Beneath these pinions, within the central recess, 7, and mounted upon the central case, C, are two rings, G and H, which are free to revolve in planes at right angles to the axis of the chuck, and have also a limited movement in the direction of this axis. The ring G is provided with gear-teeth upon its upper surface. The ring H has a scroll-thread, 42, upon its lower surface, the outer sides of which are beveled, as shown at 44. The space 43 between the threads is made of a depth slightly greater than that of the gear-teeth on the rack G and pinions F. This ring is also provided with a segment of gear-teeth, 41, in connection with which operates a spur-pinion, J. A recess, 9, is made in one side of the central recess, 7, to accommodate this pinion. Beneath the ring H is a fixed ring, I, having an annular projection, 52, fitting the recess 27 of the central case, C, to which it is fastened by screws 24 through the holes 51. The ring I is of sufficient diameter to fill the recess 8 of the frame B, thus supporting the lower end of the case C and closing the recess 7. Its thickness at 49 is somewhat less than the depth of the recess 8, leaving outside it a recess, by means of which the chuck may be centrally fastened to the chuck-plate P. Holes 50 are made in this ring I, through which the bolts 68 pass in reaching into the threaded holes 16 of the frame B. By means of these bolts the chuck is fastened to the chuck-plate. The inner face of the ring I is also provided with a scroll-thread, 46, of the same pitch as the scroll-thread upon ring H, but in the opposite direction, as is shown by a comparison of H and I, Figs. VI and VII. The inner sides of the thread 46 are beveled, 48, at the same angle as the outer sides of the thread 42, and the space 47 is sufficiently deep to receive the thread 42 of the ring H. In a certain position the threads of the two rings H and I will interlock, as shown in Fig. III, allowing the gear-ring G to be forced out of engagement with the pinions. By causing the ring H to revolve by means of the pinion J and segment 41 the contact of the inclined faces of the scroll-threads will force the ring H to rise, causing the rack G to come again into engagement with the pinions. A large angular advance of one ring in relation to the other is necessary to accomplish the requisite rise, as is shown by the arc 45, Fig. VI. On account of the comparative flatness of the inclined planes formed by the beveled sides of the scroll-threads, the operation of this mechanism is exceedingly easy, smooth, and powerful, even though the threads be unfinished. Consequently it is very inexpensive. There is also a position, after the rise has been accomplished, where the tops of the threads are in contact similar to that of solid flat plates, as shown in Fig. II, in which position no pressure, however great, can cause the threads to become interlocked; hence when the tops of the threads are in contact the gear G is held in place by a firm support under every portion of its surface. The surfaces of the cam-rings may be provided with segments of beveled scroll-threads, instead of completed convolutes, within the limits of my invention, decreasing the arc through which the loose ring must move to accomplish the rise, but lessening the ease with which it operates, by making the inclines steeper.

To afford convenient means of operating the pinion J, its journal 54 is made of such length that its upper end will be even with the face of the chuck. This upper end is slotted, as shown at 55, for the reception of the flat end 66 of the key O. To prevent the friction of the gear-ring when operating in connection with the several pinions from causing the cam-ring H to turn and assume the interlocked position, it is necessary that the pinion J be prevented from turning. This is conveniently accomplished as follows: Beneath the face of the chuck a hole, 10, is drilled into the frame B, the axis of which hole is at right angles with that of the pinion-journal 54 and is near the face of the chuck. Into this recess a catch, K, is fitted so as to slide easily. The rear end of this catch is hollow, as shown at 59, and receives a spiral spring, L, which tends to force the catch out of the recess. The front end of this catch is flattened, so that it will enter the slot 55. The upper corner of this flat projection 58 is beveled, so that the introduction of the key will force the catch back into the recess, compressing the spring L. As the end 66 of the key fills the slot 55, it is plain that after introducing it the pinion may be easily turned as many times as desired. After turning the pinion and connected cam-ring as much as is necessary to connect or disconnect the several screws, the key is withdrawn. If care be taken to withdraw the key only when the slot is in line with the catch, the pinion will be immediately locked by the action of the spring. If, however, the slot be not in line when the key is withdrawn, the above-mentioned friction can only cause the pinion to make a half-revolution at most, for so soon as the slot comes in line the catch will be forced into it and all further motion prevented. To keep the catch K from turning in the recess 10, so that the end 58 will not enter the slot 55, a groove, 60, is made in its lower side, and a pin, 61, is fitted into the bottom of the recess 10 in such a way as to project into this groove.

That the rack G may readily become disengaged from the pinions, and that the cam-ring H may be caused to follow closely down the inclines to the interlocked position shown in Fig. III, spiral springs N are provided, having seats 25 in the inner face of the shell C. Between these springs and the face of the rack thin shoe-segments M are placed, having their ends 63 so bent as to come in contact with projecting lugs 26 of the central case, C. These ends prevent the shoe-segments from turning with the rack. To accommodate the rise and fall of the cam-ring H and segment 41, the face of the pinion J is made longer than that of the gear-segment, thus preserving their engagement.

By the means above described the operator is enabled to conveniently connect or disconnect the actuating-screws, and the chuck may be either independent, universal, or eccentric at will. To facilitate placing the jaws in a central position, concentric rings 17 are marked on the face of the chuck, as shown in Fig. I.

The largest diameter of the pinions F, mounted in the inner ends of the screws E, is slightly less than that of the screw at the bottom of its thread. As the screws are made of larger diameter than heretofore, this construction is easily possible, and the jaws A will pass over the pinions. As hereinbefore described, the means of fastening the screw also allows the jaw a clear passage over it; hence this construction leaves a free radial passage-way for the jaw from end to end of the guiding-slot. As the axis of the screw-thread 3 corresponds with that of the screw E and is in the vertical plane passing through the center of the slot, the jaw may readily be reversed without the necessity of making it of two or more pieces. A jaw thus reversed is shown at A', Fig. I. The pinions F may be mounted in the outer ends of the screws, with the rack and cam-rings beneath them, as in many other chucks within the scope of my invention thus far described; but the construction shown is preferred, because the small rack employed is much less expensive.

To inclose the working parts, a hollow case or shell, C, is fitted into the central recess, 7, of the frame B. This case is provided with an annular projection, 19, of suitable diameter to allow the cam-ring H and rack G to be mounted upon it within the central recess, 7, as before described. On the inner face of this case C lugs 26 are formed, in which conical recesses 23 are made. When the case C is in place, the axes and diameters of these recesses coincide with those of the pinions F. Holes 22 are made in the center of these recesses, extending into the center hole of the case C, which is also the center hole of the chuck. These holes 22 form bearings for the pinion-journals 38, by which they are so closed as to exclude dirt. To the lower end of the annular projection 19 the fixed cam-ring I is fastened by screws 24, as before described. The outer face of the case C is provided with grooves 20, which form continuations of the guiding-slots, but are not provided with retaining-ribs 18. The bottom of the groove 20 is raised to form portion of a cylindrical surface. The radius of the arc which may be conceived as generating this surface by a longitudinal movement corresponds with that of the screw E at the bottom of its thread. This feature is shown clearly at 21, Figs. I and II. Inasmuch as the largest diameter of the pinion F is less than that of the screw E at the bottom of its thread, it follows that a cap of metal, 21, sufficient to exclude chips, &c., is left over the pinion without interfering in any degree with the movement of the jaw A. To complete the inclosure of the working parts, the cylindrical recess 14 of the frame B, into which the screw is fitted, is made smaller for a short distance at its inner end to fit the screw E at the bottom of its thread. This feature is shown at 15, Fig. II. The center case, C, is held in place by the screw 12, tapped into the joint, as shown in Fig. I, and also by the journals of the pinions.

In assemblage, the various parts having been made according to the foregoing description, the springs N, shoe segments M, gear-ring G, and cam-ring H are first mounted upon the central case, C. The fixed cam-ring I is then attached, and after inserting the locking device and pinion J in their proper positions the case C and mechanism mounted thereon is inserted in the central recess, 7, from the back side. The screws and pinions are then pushed into the recesses 14 as far as they will go and the thrust-pins D and retaining-screws 13 and 12 put in place. The jaws may now be run in and the chuck is complete.

The ease with which the screws E may be removed is an important advantage which this chuck possesses over others. If from any cause—as that of the screw-threads becoming dry—the screw and jaw should stick together, both may be removed by taking out the thrust-pin D, when they may be separated, oiled, and replaced without injury. By this construction I am also enabled to use a large screw without increasing the thickness of the jaw in proportion, as the recess receiving the screw is open at the end and the screw may be inserted in a radial direction without reference to the width of the guiding-slot above it; also, when the thrust-pin is in position the screw cannot get out of place even though the jaw be removed, for the sides of the recess are partially closed about its upper half, as shown in Fig. V.

In Figs. 3 and 4 of the drawings forming part of Letters Patent No. 47,428, dated April 25, 1865, a chuck-screw is shown having a small pinion upon its outer end in a combination which permits the jaw to pass over it; but in this case the screw is hollow and mounted upon the pinion, the end of which is extended through the screw and forms its journal.

In Letters Patent No. 110,903, dated January 10, 1871, a chuck-screw having end journals and sections of relatively continuous thread with a small central pinion is shown and claimed. It resembles the screw claimed below in having end sections of relatively continuous thread, but is constructed of three pieces, has end journals, and the central portion consists of the bevel-pinion G. It is placed in a cored recess having semicircular bearings in its ends.

In Letters Patent No. 235,836, dated December 21, 1880, a cam-ring having a segment of internal teeth is claimed in a combination which secures connected rings but independent movement.

In Letters Patent No. 250,400, dated December 6, 1881, a central inclosed annular recess between the front and back plates is shown with the operating mechanism. The annular recess is formed complete in the back plate, B, as shown in Fig. 5, and inclosed by the front plate, against which it abuts. The construction and arrangement of parts described and claimed by me are, however, obviously different from the patents referred to.

In Letters Patent No. 279,017, dated June 5, 1883, a screw is shown and claimed which resembles mine in appearance, having the central abutting shoulders and end sections of screw-thread. The screw-threads, however, are not relatively continuous, but in opposite directions and of different pitches.

Having thus described my invention and shown wherein its features differ from those of lathe-chucks most nearly approaching it in design and arrangement, what I claim as new, and desire to secure by Letters Patent of the United States, is—

1. The combination, in a lathe-chuck, of the holding-jaws, each having a screw, E, adapted thereto, said screw being turned down for a portion of its length near its center to form abutting shoulders 34, and being provided at both ends with sections of screw-thread relatively the same as though continuous from end to end.

2. The combination, in a lathe-chuck, of the holding-jaws and the above-described screw E, adapted thereto, with a thrust-pin, D, having a projection, 29, fitting between the abutting shoulders of the screw, as described.

3. The combination, in a lathe-chuck, of the holding-jaws and the described screw E, adapted thereto, said screw being provided at one of its ends with a pinion in diameter not greater than the screw at the bottom of its thread, substantially as described.

4. The combination, in a lathe-chuck, of the body or frame B, provided with radial guiding-slots extending to the outer periphery thereof, the jaws adapted thereto, parallel cylindrical recesses 14, having their axes lower than the plane of the bottom of the guiding-slots and in the vertical planes passing through the center lines of the slots, and the screws for operating the jaws located within the said cylindrical recesses, substantially as described.

5. The combination, in a lathe-chuck, with the jaws and their operating mechanism, of the cam-rings H and I, having opposite beveled scroll-threads on their surfaces, for the purpose described.

6. In a lathe-chuck, the combination, with the holding-jaws and the operating mechanism therefor, of the revolving cam-ring H, spur-pinion J, having the outer end of its journal slotted, and the flattened spring-catch K, which will be forced back by the introduction of the key into the slot of the pinion-journal, substantially as described.

7. The combination, in a lathe-chuck, of the holding-jaws and the mechanism for operating the same with the central case, C, the annular projection 19, rack and cam-rings mounted thereon, said case being provided with conical recesses 23, pinion-bearings 22, and grooves 20, the latter having raised cylindrical bottoms to inclose the pinions and permit free passage of the jaws, substantially as described.

8. In a lathe-chuck, the combination of the central case, C, above described, with spiral springs seated in its upper inner surface, thin shoe-segments M, gear-ring G, cam-rings H and I, and the holding-jaws, with their operating devices, as specified.

9. In a lathe-chuck, the combination of the frame B, made in one piece, the holding-jaws and operating devices therefor, and the central annular case, C, provided with grooves 20, and an annular projection, 19, on which to mount the rack, substantially as described.

10. The combination, in a lathe-chuck, of the described central annular box, 7, the described operating parts adapted to be inserted therein, the said annular box being formed by the walls of the body of the chuck, the annular case C, and the bottom plate, I, substantially as described.

LUCIUS E. WHITON.

Witnesses:
 PLINY M. HARWOOD,
 HENRY LUFLER.

Correction in Letters Patent No. 369,758.

It is hereby certified that the residence of the assignee in Letters Patent No. 369,758, granted September 13, 1887, upon the application of Lucius E. Whiton, of West Stafford, Connecticut, for an improvement in "Lathe Chucks," was erroneously written and printed "of same place," whereas said residence should have been written and printed *New London, Connecticut;* and that the Letters Patent should be read with this correction therein that the same may conform to the record of the case in the Patent Office.

Signed, countersigned, and sealed this 4th day of October, A. D. 1887.

[SEAL.]
                                                    D. L. HAWKINS,
*Acting Secretary of the Interior.*

Countersigned:
    BENTON J. HALL,
        *Commissioner of Patents.*